United States Patent
Miyai et al.

(10) Patent No.: US 11,078,414 B2
(45) Date of Patent: Aug. 3, 2021

(54) METHOD FOR PRODUCING FLUORESCENT MATERIAL, AND FLUORESCENT MATERIAL

(71) Applicant: NICHIA CORPORATION, Anan (JP)

(72) Inventors: Ryuta Miyai, Komatsushima (JP); Kazuya Nishimata, Anan (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 294 days.

(21) Appl. No.: 16/368,984

(22) Filed: Mar. 29, 2019

(65) Prior Publication Data

US 2019/0300785 A1  Oct. 3, 2019

(30) Foreign Application Priority Data

Mar. 29, 2018  (JP) .............................. JP2018-064632
Mar. 11, 2019  (JP) .............................. JP2019-043708

(51) Int. Cl.
- *C09K 11/64* (2006.01)
- *C09K 11/08* (2006.01)
- *C09K 11/57* (2006.01)

(52) U.S. Cl.
CPC ........ *C09K 11/643* (2013.01); *C09K 11/0883* (2013.01); *C09K 11/57* (2013.01); *C09K 11/645* (2013.01)

(58) Field of Classification Search
CPC ............................ C09K 11/57; C09K 11/0883
See application file for complete search history.

(56) References Cited

U.S. PATENT DOCUMENTS 8,057,704 B2  11/2011  Xie et al.
2009/0121608 A1  5/2009  Xie et al.
(Continued)

FOREIGN PATENT DOCUMENTS

JP  2009096854 A  5/2009
JP  2016216711 A  12/2016
(Continued)

*Primary Examiner* — C Melissa Koslow
(74) *Attorney, Agent, or Firm* — Hunton Andrews Kurth LLP

(57) ABSTRACT

A method for producing a γ-AlON fluorescent material, comprising: preparing a first mixture containing a compound containing Mn, a compound containing Li, a compound containing Mg, an aluminum oxide, and an aluminum nitride, in which the amount of fluorine is 150 ppm by mass or less relative to the total amount of the first mixture excluding fluorine, and subjecting the first mixture to a first heat treatment to obtain a first calcined product having an average particle diameter D1, as measured according to a Fisher Sub-Sieve Sizer method, of 10.0 μm or more; and preparing a second mixture containing the first calcined product, a compound containing Mn, a compound containing Li, a compound containing Mg, an aluminum oxide, and an aluminum nitride, in which the amount of fluorine is 150 ppm by mass or less relative to the total amount of the second mixture excluding fluorine, and subjecting the second mixture to a second heat treatment to obtain a second calcined product having an average particle diameter D2, as measured according to the Fisher Sub-Sieve Sizer method, of 16.0 μm or more, wherein the second mixture contains the first calcined product in an amount of more than 20% by mass and 82% by mass or less.

8 Claims, 1 Drawing Sheet

(56) References Cited

U.S. PATENT DOCUMENTS

2018/0127647 A1 5/2018 Hirosaki
2018/0127648 A1 5/2018 Hirosaki

FOREIGN PATENT DOCUMENTS

| WO | 2007/099862 A1 | 9/2007 |
| WO | 2016/186057 A1 | 11/2016 |
| WO | 2016/186058 A1 | 11/2016 |

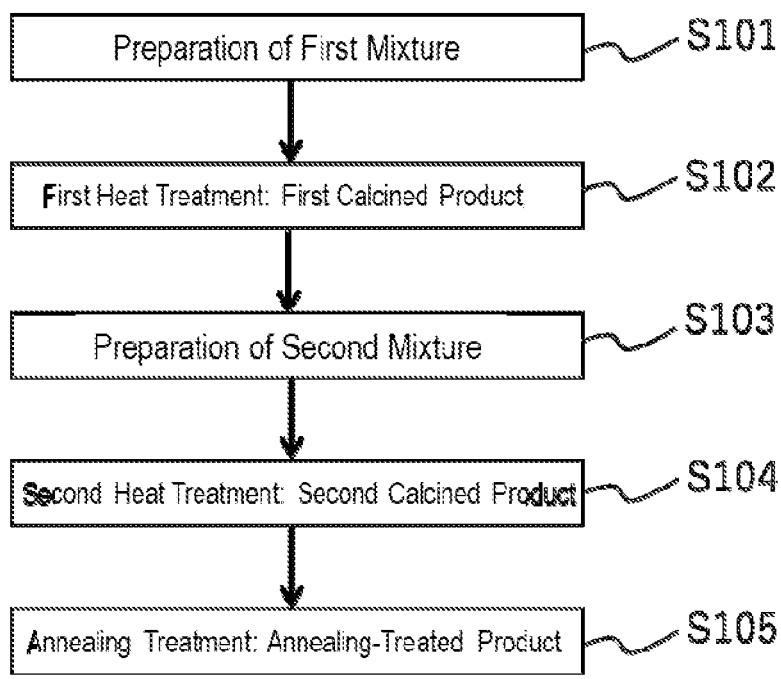

METHOD FOR PRODUCING FLUORESCENT MATERIAL, AND FLUORESCENT MATERIAL

CROSS-REFERENCE TO RELATED PATENT APPLICATION

This application claims priority to Japanese Patent Application No. 2018-064632, filed on Mar. 29, 2018, and Japanese Patent Application No. 2019-043708, filed on Mar. 11, 2019, the entire disclosures of which are incorporated herein by references in their entirety.

BACKGROUND

Technical Field

In regard to a method for producing a fluorescent material and a fluorescent material, the present invention relates to a method for producing a fluorescent material having a cubic spinel-type aluminum oxynitride crystal (hereinafter also referred to as "γ-AlON fluorescent material"), and a γ-AlON fluorescent material. In this specification, the "fluorescent material" is used in the same meaning as a "fluorescent phosphor".

Description of Related Art

Various light emitting devices that emit white light, bulb color light, or orange light according to the principle of light color mixing by combination of a light source such as a light emitting diode (hereinafter also referred to as "LED") and a fluorescent material have been developed. These light emitting devices are being utilized in a wide variety of fields including a light emitting device for automobile or indoor use, a backlight source for a liquid crystal display device, a display, a light emitting device for an illumination.

Known fluorescent materials used in such light emitting devices include, for example, inorganic fluorescent materials having a crystal structure containing nitrogen, such as a SiAlON fluorescent material, an oxynitride fluorescent material, and a nitride fluorescent material. A γ-AlON fluorescent material obtained by activating Mn on a spinel-type aluminum oxynitride crystal belonging to a cubic system (γ-AlON) is also known (see Japanese Unexamined Patent Publication No. 2016-216711). The γ-AlON fluorescent material is excited with blue light having a light emission peak wavelength in a range of, for example, 410 nm or more and 470 nm or less to thereby emit green light.

However, the γ-AlON fluorescent material is, when combined with a light emitting element having a light emission peak wavelength in a range of 380 nm or more and 485 nm or less (hereinafter also referred to as "near-UV to blue region"), is desired for further improving the light emission intensity.

Accordingly, the present disclosure has an object to provide a γ-AlON fluorescent material having a high light emission intensity through photoexcitation in the near-UV to blue region; and a method for producing the same.

SUMMARY

Measures for solving the aforementioned problem are as follows. The present disclosure includes the following embodiments.

A first embodiment of the present invention relates to a method for producing a γ-AlON fluorescent material, comprising: preparing a first mixture containing a compound containing Mn, a compound containing Li, a compound containing Mg, an aluminum oxide, and an aluminum nitride, in which the amount of fluorine is 150 ppm by mass or less relative to the total amount of the first mixture excluding fluorine, and subjecting the first mixture to a first heat treatment to obtain a first calcined product having an average particle diameter D1, as measured according to a Fisher Sub-Sieve Sizer method, of 10.0 μm or more; and preparing a second mixture containing the first calcined product, a compound containing Mn, a compound containing Li, a compound containing Mg, an aluminum oxide, and an aluminum nitride, in which the amount of fluorine is 150 ppm by mass or less relative to the total amount of the second mixture excluding fluorine, and subjecting the second mixture to a second heat treatment to obtain a second calcined product having an average particle diameter D2, as measured according to the Fisher Sub-Sieve Sizer method, of 16.0 μm or more, wherein the second mixture contains the first calcined product in an amount of more than 20% by mass and 82% by mass or less relative to the total amount of the second mixture excluding fluorine.

A second embodiment of the present disclosure relates to a γ-AlON fluorescent material comprising a composition represented by the following formula (I) and having an average particle diameter D2, as measured according to the Fisher Sub-Sieve Sizer method, of 16 μm or more.

$$Mn_aMg_bLi_cAl_dO_eN_fF_g \qquad (I)$$

wherein a, b, c, d, e, f, and g each satisfy $0.005 \leq a \leq 0.02$, $0.01 \leq b \leq 0.035$, $0.01 \leq c \leq 0.04$, $0.3 \leq d \leq 0.45$, $0.4 \leq e \leq 0.6$, $0.03 \leq f \leq 0.06$, and $0 \leq g \leq 0.00016$, when $a+b+c+d+e+f=1$.

In accordance with the present disclosure, a method for producing a γ-AlON fluorescent material having a high light emission intensity through photoexcitation in the near-UV to blue region; and the γ-AlON fluorescent material, can be provided.

BRIEF DESCRIPTION OF THE DRAWINGS

The figure is a flowchart showing an order of steps in the method for producing a γ-AlON fluorescent material according to the first embodiment of the present disclosure.

DETAILED DESCRIPTION

Embodiments of the method for producing a γ-AlON fluorescent material and the γ-AlON fluorescent material according to the present invention are hereunder described. The embodiments shown below are exemplifications for exemplifying the technical idea of the present invention, and the present invention is not limited to the method for producing a γ-AlON fluorescent material and the γ-AlON fluorescent material mentioned below. Standards according to JIS Z8110 are applied to the relations between color names and chromaticity coordinates, the relations between wavelength ranges of light and color names of monochromatic lights.

Method for Producing γ-AlON Fluorescent Material

The method for producing a γ-AlON fluorescent material according to the first embodiment of the present invention includes: preparing a first mixture containing a compound containing Mn, a compound containing Li, a compound containing Mg, an aluminum oxide, and an aluminum nitride, in which the amount of fluorine is 150 ppm by mass or less relative to the total amount of the first mixture excluding fluorine, and subjecting the first mixture to a first heat treatment to obtain a first calcined product having an average particle diameter D1, as measured according to the Fisher Sub-Sieve Sizer method (hereinafter also referred to as "FSSS method"), of 10.0 μm or more; and preparing a second mixture containing the first calcined product, a compound containing Mn, a compound containing Li, a compound containing Mg, an aluminum oxide, and an aluminum nitride, in which the amount of fluorine is 150 ppm by mass or less relative to the total amount of the second mixture excluding fluorine, and subjecting the second mixture to a second heat treatment to obtain a second calcined product having an average particle diameter D2, as measured according to the FSSS method, of 16.0 pn or more, wherein the second mixture contains the first calcined product in an amount of more than 20% by mass and 82% by mass or less relative to the total amount of the second mixture excluding fluorine.

The average particle diameter measured by the FSSS method is a value that is also referred to as a Fisher Sub-Sieve Sizer's number. The FSSS method is a type of an air permeability method and a method for measuring a specific surface area of particles by utilizing the flow resistance of air to determine a particle diameter.

The figure is a flowchart showing an illustrative order of steps in the method for producing a γ-AlON fluorescent material. The method for producing a γ-AlON fluorescent material contains a step S102 of subjecting a first mixture to a first heat treatment to obtain a first calcined product having an average particle diameter D1, as measured according to the FSSS method, of 10.0 μm or more, and a step S104 of subjecting a second mixture to a second heat treatment to obtain a second calcined product having an average particle diameter D2, as measured according to the FSSS method, of 16.0 μm or more. The method for producing a γ-AlON fluorescent material contains a step S101 of preparing a first mixture before the step S102 of obtaining a first calcined product, and a step S103 of preparing a second mixture before the step S104 of obtaining a second calcined product. In addition, the method for producing a γ-AlON fluorescent material preferably contains a step S105 of subjecting a second calcined product to an annealing treatment after the step of obtaining a second calcined product to obtain an annealing-treated product. Further, as not shown in the FIGURE, the method for producing a γ-AlON fluorescent material may contain a dispersion and classification step after the first heat treatment and before the second heat treatment, may contain a dispersion and classification step after the second heat treatment and before the annealing treatment, or may contain a dispersion and classification step after the annealing treatment.

In the method for producing a γ-AlON fluorescent material, by preparing a second mixture containing a first calcined product, a compound containing Mn, a compound containing Li, a compound containing Mg, an aluminum oxide, and an aluminum nitride, and by subjecting the second mixture to a second heat treatment, the first calcined product acts as a seed crystal to promote crystal growth thereof, and thus a relatively large second calcined product having an average particle diameter D2, as measured according to the FSSS method, of 16.0 μm or more can be obtained. The obtained second calcined product has an average particle diameter having a size which is easy to handle in forming a light emitting device. The average particle diameter D2, as measured according to the FSSS method, of the second calcined product obtained by the method for producing a γ-AlON fluorescent material may be 17.0 μm or more, may be 18.0 μm or more, or may be 19.0 μm or more.

Further, the average particle diameter D2, as measured according to the FSSS method, of the second calcined product obtained by the production method is preferably 60.0 μm or less. The obtained second calcined product contains a γ-AlON fluorescent material having a stable crystal structure in a large amount. Since the crystal structure is stable, a γ-AlON fluorescent material having a high light emission intensity can be obtained. When the average particle diameter, as measured according to the FSSS method, of the obtained γ-AlON fluorescent material is more than 60.0 μm, and when the γ-AlON fluorescent material is used for a light emitting device, the dispersibility in a resin contained in the fluorescent member that is a member constituting the light emitting device is deteriorated, a resin composition containing the γ-AlON fluorescent material is difficult to inject in a molded body constituting the light emitting device, and the workability in producing the light emitting device may therefore lower. When the average particle diameter, as measured according to the FSSS method, of the γ-AlON fluorescent material is more than 60.0 μm, and when the γ-AlON fluorescent material is used in combination with a fluorescent material capable of emitting other color light than that of the γ-AlON fluorescent material, a balance of light emitted from the respective fluorescent materials is lost, it may be hard to mix colors of the light for obtaining a desired color, and color unevenness may occur.

In accordance with the production method, the fluorine contents in the first mixture for forming the first calcined product and the second mixture for forming the second calcined product are small, so that the fluorine contents contained in the first calcined product and the second calcined product can be lowered. Thus, the occurrence of dullness on the body color of the fluorescent material due to incorporated fluorine in the crystal structure can be suppressed, and a γ-AlON fluorescent material having a high light emission intensity can be therefore obtained. Further, the formation of an unstable phase such as an amorphous part or a low crystalline part having a high dislocation density and defect density, due to incorporated fluorine in the crystal structure of the first calcined product or the second calcined product, can be suppressed.

Preparation of First Mixture

The first mixture may be obtained by mixing a compound containing Mn, a compound containing Li, a compound containing Mg, an aluminum oxide, and an aluminum nitride. The amount of fluorine in the first mixture is 150 ppm by mass or less relative to the total amount of the first mixture excluding fluorine. When the amount of fluorine in the first mixture is more than 150 ppm by mass relative to the total amount of the first mixture excluding fluorine, the amount of fluorine in the first calcined product to be a seed crystal in the second heat treatment becomes large, the body color of the fluorescent material becomes dull due to incorporated fluorine in the first calcined product, and thus a γ-AlON fluorescent material having a high light emission intensity is difficult to obtain. Further, when fluorine is incorporated in the obtained first calcined product, the crystal structure becomes unstable, and the light emission intensity of the γ-AlON fluorescent material formed from the second calcined product obtained by growing the crystal in the first calcined product as a seed crystal, may be lowered. In order to set the amount of fluorine in the first mixture to 150 ppm by mass or less relative to the total amount of the first mixture excluding fluorine, it is preferable to eliminate a fluoride from each of the compound containing Mn, the compound containing Li, and the compound containing Mg.

Even in the case of eliminating a fluoride from the compounds to be used for the first mixture, the amount of fluorine in the first mixture relative to the total amount of the first mixture excluding fluorine may generally be 1 ppm or more, may be 5 ppm or more, or may be also 10 ppm or more.

In the method for producing a γ-AlON fluorescent material, in order to obtain a calcined product having a relatively large particle diameter by promoting a reaction among raw materials in the mixture and uniformly advancing a solid phase reaction to promote the crystal growth, a flux may be contained in the mixture together with the raw materials. As a flux, a fluoride containing elements constituting the crystal structure of the fluorescent material may be used. In the method for producing a γ-AlON fluorescent material, in order to set the amount of fluorine to 150 ppm by mass or less relative to the total amount of the first mixture or the second mixture excluding fluorine, it is preferable to eliminate a fluoride from the compound to be used as a raw material or a flux.

Examples of the compound containing Mn may include a carbonate, an oxide, a hydroxide, a nitrate, and a sulfate, each containing Mn. The compound containing Mn may be in the form of a hydrate. Specifically, the compound may include at least one of $MnCO_3$, $MnO_2$, $Mn_2O_3$, $Mn_3O_4$, MnO, $Mn(OH)_2$, $Mn(NO_3)_2$, and $MnSO_4$. One alone or two or more of the compounds containing Mn may be used either singly or in combination. Among the compounds containing Mn, a carbonate and an oxide are preferred from the viewpoint of easy handleability. A carbonate containing Mn ($MnCO_3$) is more preferred. This is because the stability thereof in air is good, it can be easily decomposed by heating, elements other than the intended composition hardly remain, and the light emission intensity can be readily prevented from being lowered by residual impurity elements. In the compound containing Mn, a fluoride such as $MnF_2$ is preferably eliminated.

Examples of the compound containing Mg may include an oxide, a hydroxide, a carbonate, a nitrate, a sulfate, and a nitride, each containing Mg. The compound containing Mg may be in the form of a hydrate. Specifically, the compound may include at least one of MgO, $MgCO_3$, $Mg(NO_3)_2$, $MgSO_4$, and $Mg_3N_2$. One alone or two or more of the compounds containing Mg may be used either singly or in combination. Among the compounds containing Mg, a carbonate and an oxide are preferred from the viewpoint of easy handleability. An oxide containing Mg (MgO) is more preferred. This is because the stability thereof in air is good, it can be easily decomposed by heating, elements other than the intended composition hardly remain, and the light emission intensity can be readily prevented from being lowered by residual impurity elements. In the compound containing Mg, a fluoride such as $MgF_2$ is preferably eliminated.

Examples of the compound containing Li may include a carbonate, an oxide, an aluminate, a hydroxide, a nitrate, a sulfate, and a nitride, each containing Li. The compound containing Li may be in the form of a hydrate. Specifically, the compound may include at least one of $Li_2CO_3$, $Li_2O$, $LiAlO_2$, LiOH, $LiNO_3$, $Li_2SO_4$, and $Li_3N$. One alone or two or more of the compounds containing Li may be used either singly or in combination. Among the compounds containing Li, a carbonate and an oxide are preferred from the viewpoint of easy handleability. A carbonate containing Li ($Li_2CO_3$) is more preferred. This is because the stability thereof in air is good, it can be easily decomposed by heating, elements other than the intended composition hardly remain, and the light emission intensity can be readily prevented from being lowered by residual impurity elements. In the compound containing Li, a fluoride such as LiF is preferably eliminated.

The first mixture contains an aluminum oxide and an aluminum nitride. The aluminum oxide and the aluminum nitride form a framework of the crystal structure of aluminum oxynitride (AlON). For the first mixture, the compound containing Mn, the compound containing Mg, the compound containing Li, the aluminum oxide, and the aluminum nitride are weighed so as to be in a desired blending ratio, and may subsequently be ground and mixed, for example, using a ball mill, a vibration mill, a hammer mill, a mortar with a pestle, or the like. In the case of grinding and mixing the first mixture by using a mortar with a pestle, a mortar made of aluminum oxide (alumina) that is the same material as the raw material contained in the first mixture is preferably used in order to avoid from mixing of elements other than the intended composition. For mixing the first mixture, for example, a mixing machine such as a ribbon blender, a Henschel mixer, a V-shaped blender may be used, and the components may be ground and mixed using both a dry-type grinder and a mixing machine. The mixing may be dry-type mixing, or may also be wet-type mixing with a solvent added thereto. The dry-type mixing is preferred. This is because the processing time can be shortened more in the dry-type mixing than in the wet-type mixing, thereby leading to productivity improvement.

First Heat Treatment

As for the first heat treatment, the first mixture is subjected to the first heat treatment to obtain a first calcined product having an average particle diameter D1, as measured according to the FSSS method, of 10.0 μm or more.

In the first heat treatment, the first mixture is placed in a crucible or a boat made of a carbon material like such as graphite, boron nitride (BN), aluminum oxide (alumina), tungsten (W), or molybdenum (Mo), and the heat treatment can be then performed.

The temperature in the first heat treatment is preferably in a range of 1,600° C. or higher and 1,900° C. or lower, more preferably in a range of 1,650° C. or higher and 1,900° C. or lower, even more preferably in a range of 1,700° C. or higher and 1,850° C. or lower. When the temperature in the first heat treatment is in a range of 1,600° C. or higher and 1,900° C. or lower, a first calcined product having an average particle diameter D1, as measured according to the FSSS method, of 10.0 μm or more; and containing γ-AlON crystal can be obtained. For the heat treatment of the first mixture, for example, an electric furnace, a gas pressurized furnace, or the like may be used.

In the first heat treatment atmosphere, the first mixture is preferably calcined in a nitrogen atmosphere pressurized at 0.2 to 1.2 MPa to obtain a first calcined product.

The first heat treatment time differs depending on the heating rate, the heat treatment atmosphere, and the like. The first heat treatment time after reaching at the first heat treatment temperature in a range of 1,600° C. or higher and 1,900° C. or lower is preferably 1 hour or more, more preferably 2 hours or more, even more preferably 3 hours or more, and is preferably 20 hours or less, more preferably 18 hours or less, even more preferably 15 hours or less.

The first calcined product obtained by the first heat treatment contains a γ-AlON crystal, may contain an AlON solid solution crystal, and may be a composite of AlON and an aluminum nitride (AlN).

The average particle diameter D1, as measured according to the FSSS method, of the first calcined product is 10.0 μm or more, preferably 11.0 μm or more, more preferably 12.0

μm or more. The average particle diameter D1, as measured according to the FSSS method, of the first calcined product is preferably large, but the average particle diameter D1 of the first calcined product obtained from the first mixture not containing a flux is generally less than 16.0 μm. When the average particle diameter D1, as measured according to the FSSS method, of the first calcined product is 10.0 μm or more, the first calcined product acts as a seed crystal in the second heat treatment to promote crystal growth thereof, thereby obtaining a second calcined product having an average particle diameter D2, as measured according to the FSSS method, of 16.0 μm or more.

Preparation of Second Mixture

The second mixture is obtained by mixing the first calcined product, a compound containing Mn, a compound containing Li, a compound containing Mg, an aluminum oxide, and an aluminum nitride. The amount of fluorine in the second mixture is 150 ppm by mass or less relative to the total amount of the second mixture excluding fluorine. When the amount of fluorine in the second mixture is more than 150 ppm by mass relative to the total amount of the second mixture excluding fluorine, the amount of fluorine in the second calcined product becomes large, the body color of the second calcined product to be a γ-AlON fluorescent material becomes dull due to incorporated fluorine in the second calcined product, and thus a γ-AlON fluorescent material having a high light emission intensity is difficult to obtain. Further, when a large amount of fluorine is incorporated in the second calcined product, it can be presumed that the crystal structure becomes unstable due to incorporated fluorine in the crystal structure. In order to set the amount of fluorine in the second mixture to 150 ppm by mass or less relative to the total amount of the second mixture excluding fluorine, each of the compound containing Mn, the compound containing Li, and the compound containing Mg is preferably a compound excluding a compound containing fluorine. Specifically, for example, $MnF_2$, LiF, and $MgF_2$ are preferably eliminated. Even in the case of eliminating a fluoride from compounds to be used for the second mixture, the amount of fluorine in the second mixture relative to the total amount of the second mixture excluding fluorine may generally be 1 ppm or more, may be 5 ppm or more, may be 10 ppm or more, or may be also 20 ppm or more.

The content of the first calcined product in the second mixture is in a range of more than 20% by mass and 82% by mass or less relative to the total amount of the second mixture excluding fluorine. The content of the first calcined product in the second mixture is preferably in a range of 25% by mass or more and 82% by mass or less, more preferably in a range of 30% by mass or more and 81% by mass or less, even more preferably in a range of 35% by mass or more and 81% by mass or less, still more preferably in a range of 40% by mass or more and 80% by mass or less, particularly preferably in a range of 40% by mass or more and 75% by mass or less, relative to the total amount of the second mixture excluding fluorine. When the content of the first calcined product in the second mixture is in a range of more than 20% by mass and 82% by mass or less relative to the total amount of the second mixture excluding fluorine, the first calcined product acts as a seed crystal in the second heat treatment to promote crystal growth thereof to obtain a relatively large second calcined product having an average particle diameter D2, as measured according to the FSSS method, of 16.0 μm or more, and the second calcined product can be used as a γ-AlON fluorescent material. When the content of the first calcined product in the second mixture is 20% by mass or less, the amount of the first calcined product to be a seed crystal is too small to promote the crystal growth in the second heat treatment, and if so, a second calcined product having a relatively large average particle diameter is difficult to obtain. The γ-AlON crystal and the AlON solid solution crystal are relatively hard crystals. However, by containing the first calcined product to be a seed crystal in an amount of more than 20% by mass in the second mixture, the crystal growth can be promoted from the seed crystal by the second heat treatment, and a second calcined product having a relatively large particle diameter can be obtained. When the content of the first calcined product in the second mixture is more than 82% by mass relative to the total amount of the second mixture excluding a fluorine element, the amount of the compound to be a raw material contained in the second mixture becomes relatively small so that the crystal growth cannot be promoted, and a second calcined product having a large particle diameter cannot be obtained.

As for each of the compound containing Mn, the compound containing Li, and the compound containing Mg, a compound exemplified as the compound contained in the first mixture can be used. The compound containing Mn, the compound containing Li, and the compound containing Mg may be the same kind of compound as the compound contained in the first mixture, or may be a different kind of compound therefrom. As for each of the compound containing Mn, the compound containing Li, and the compound containing Mg, one alone or two or more of the compounds may be used either singly or in combination. Each of the compound containing Mn, the compound containing Li, and the compound containing Mg is preferably a carbonate or an oxide from the viewpoint of easy handleability, and more preferably a carbonate containing Mn ($MnCO_3$), a carbonate containing Li ($Li_2CO_3$), or an oxide containing Mg (MgO) from the viewpoint of stability and degradability of the compound and hardly remaining residual impurity elements.

The second mixture preferably contains an aluminum oxide and an aluminum nitride in a total amount of 15% by mass or more relative to the total amount of the second mixture excluding fluorine. The aluminum oxide and the aluminum nitride form a framework of the AlON crystal structure. When the total content of the aluminum oxide and the aluminum nitride in the second mixture is 15% by mass or more, the first calcined product acts as a seed crystal to promote the crystal growth, and a large second calcined product having an average particle diameter D2, as measured according to the FSSS method, of 16.0 μm or more can be obtained. The total content of the aluminum oxide and the aluminum nitride in the second mixture is more preferably 16% by mass or more, even more preferably 20% by mass or more, relative to the total amount of the second mixture excluding fluorine.

Second Heat Treatment

As for the second heat treatment, the second mixture is subjected to the second heat treatment to obtain a second calcined product having an average particle diameter D2, as measured according to the FSSS method, of 16.0 μm or more. The second mixture is placed in a crucible or a boat made of a material that is exemplified when performing the first heat treatment on the first mixture, and the second heat treatment can be then performed.

The temperature in the second heat treatment is preferably in a range of 1,600° C. or higher and 1,900° C. or lower, more preferably in a range of 1,650° C. or higher and 1,900° C. or lower, even more preferably in a range of 1,700° C. or higher and 1,850° C. or lower. When the temperature in the second heat treatment is in a range of 1,600° C. or higher and 1,900° C. or lower, the first calcined product acts as a seed crystal to further promote the crystal growth, and a second calcined product having an average particle diameter D2, as measured according to the FSSS method, of 16.0 μm or more; and containing a γ-AlON crystal can be obtained. For the heat treatment of the second mixture, the same apparatus as the one used in the heat treatment of the first mixture, for example, an electric furnace, a gas pressurized furnace, or the like may be used.

As for the second heat treatment atmosphere, an atmosphere that is exemplified as the first heat treatment atmosphere can be applied. The second heat treatment atmosphere may be the same as or different from the first heat treatment atmosphere. In the second heat treatment atmosphere, the second mixture is preferably calcined in a nitrogen atmosphere to obtain a second calcined product. The nitrogen atmosphere may contain other gases such as hydrogen, oxygen, ammonia. The nitrogen gas in the nitrogen atmosphere is for example, 90% by volume or more, preferably 95% by volume or more, more preferably 99% by volume, and may be 100% by volume.

The second heat treatment time may vary depending on the heating rate, the heat treatment atmosphere, and the like. The second heat treatment time after reaching at the second heat treatment temperature in a range of 1,600° C. or higher and 1,900° C. or lower is preferably 1 hour or more, more preferably 2 hours or more, even more preferably 3 hours or more, and is preferably 20 hours or less, more preferably 18 hours or less, even more preferably 15 hours or less.

The second calcined product obtained by the second heat treatment contains a γ-AlON crystal, may contain an AlON solid solution crystal, and may be a composite of AlON and AlN.

The average particle diameter D2, as measured according to the FSSS method, of the second calcined product is 16.0 μm or more, and is preferably 60.0 μm or less, more preferably 50.0 μm or less, even more preferably 40.0 μm or less, still more preferably 30.0 μm or less, particularly preferably 25.0 μm or less. The average particle diameter D2, as measured according to the FSSS method, of the second calcined product is preferably 17.0 μm or more, more preferably 18.0 μm or more. When the average particle diameter D2 of the second calcined product is 16.0 μm or more, it is large enough to emit light in a desired wavelength range by absorbing light emitted from a light source, and the second calcined product can be used as a γ-AlON fluorescent material having a high light emission intensity. When the average particle diameter D2 of the second calcined product is preferably 60.0 μm or less, more preferably 50.0 μm or less, and when forming a light emitting device, the dispersibility in a resin constituting a fluorescent member of the light emitting device can be improved. In addition, the second calcined product can be used as a γ-AlON fluorescent material that can be easily injected in a molded body constituting the light emitting device and easily handled in forming the light emitting device. Further, when the average particle diameter D2 of the second calcined product is preferably 60.0 μm or less, more preferably 50.0 μm or less, and when the second calcined product is used for the light emitting device as a γ-AlON fluorescent material in combination with other fluorescent material, light emitted from the respective fluorescent materials can be mixed in good balance without losing a balance of mixed color due to light emitted from a fluorescent material having a too large particle diameter, and a desired mixed color having suppressed color unevenness can be therefore obtained.

Annealing Treatment

The method for producing a γ-AlON fluorescent material preferably contains a step of subjecting the second calcined product to an annealing treatment after the second heat treatment to obtain an annealing-treated product. In the second calcined product, Mn which is other than divalence present in the second calcined product can be reduced by the annealing treatment to increase the ratio of the divalent Mn in the γ-AlON fluorescent material, and the light emission intensity of the γ-AlON fluorescent material can be therefore increased.

The temperature in the annealing treatment is preferably a temperature lower than the first heat treatment temperature or the second heat treatment temperature. The temperature in the annealing treatment is preferably in a range of 1,100° C. or higher and 1,500° C. or lower, more preferably in a range of 1,100° C. or higher and 1,400° C. or lower, even more preferably in a range of 1,150° C. or higher and 1,350° C. or lower. When the temperature in the annealing treatment falls within a range of 1,100° C. or higher and 1,500° C. or lower, Mn which is other than divalence contained in the second calcined product can be reduced by the annealing treatment to increase the ratio of the divalent Mn in the γ-AlON fluorescent material, and thus a γ-AlON fluorescent material having a high light emission intensity can be obtained.

In the annealing treatment, after heating the atmosphere where the second calcined product is placed up to the temperature in the annealing treatment, the temperature is preferably maintained for a certain time. The annealing treatment time is preferably in a rage of 1 hour or more and 48 hours or less, more preferably in a range of 2 hours or more and 24 hours or less, even more preferably in a range of 3 hours or more and 20 hours or less. When the annealing treatment time falls within the predetermined range, Mn which is other than divalence contained in the annealing-treated product can be reduced to increase the ratio of the divalent Mn in the γ-AlON fluorescent material, and the light emission intensity of the γ-AlON fluorescent material can be therefore increased.

The atmosphere in the annealing treatment is preferably a reducing atmosphere. The atmosphere in the annealing treatment may be an atmosphere containing at least one rare gas selected from the group consisting of helium, neon, and argon, and hydrogen, and more preferably contains at least argon and hydrogen in the atmosphere.

In the case of performing an annealing treatment, the pressure is preferably an atmospheric pressure (about 0.1 MPa) or more and 1 MPa or less, more preferably the atmospheric pressure or more and 0.5 MPa or less, even more preferably the atmospheric pressure or more and 0.2 MPa or less.

The annealing treatment may be performed under a reduced pressure that is lower than the atmospheric pressure. Here, in the reduced pressure, the presence of gases in the annealing treatment may not be excluded, and even in the annealing treatment in the reduced pressure, gases such as rare gas, nitrogen, hydrogen, and oxygen may be present.

The average particle diameter D3, as measured according to the FSSS method, of the annealing-treated product is preferably 16.0 μm or more, and is preferably 60.0 μm or less, more preferably 50.0 μm or less, even more preferably 40.0 μm or less, still more preferably 30.0 μm or less, particularly preferably 25.0 μm or less. The average particle diameter D3, as measured according to the FSSS method, of the annealing-treated product is more preferably 17.0 μm or more, even more preferably 18.0 μm or more. The average particle diameter D3 of the annealing-treated product may be the same as or different from the average particle diameter D2 of the second calcined product. When the average particle diameter D3 of the annealing-treated product is 16.0 µm or more, it is large enough to emit light in a desired wavelength range by absorbing light emitted from a light source, and the annealing-treated product can be used as a γ-AlON fluorescent material having a high light emission intensity. When the average particle diameter D3 of the annealing-treated product is preferably 60.0 µm or less, more preferably 50.0 µm or less, and when forming a light emitting device, the dispersibility in a resin constituting a fluorescent member of the light emitting device can be improved. In addition, the annealing-treated product can be used as a γ-AlON fluorescent material that can be easily injected in a molded body constituting the light emitting device and easily handled in forming the light emitting device. Further, when the average particle diameter D3 of the annealing-treated product is preferably 60.0 µm or less, more preferably 50.0 µm or less, and when the annealing-treated product is used for the light emitting device as a γ-AlON fluorescent material in combination with other fluorescent material, light emitted from the respective fluorescent materials can be mixed in good balance without losing a balance of mixed color due to light emitted from a fluorescent material having a too large particle diameter, and a desired mixed color having suppressed color unevenness can be therefore obtained.

Dispersion Treatment and Classification Treatment

The first calcined product, the second calcined product, or the annealing-treated product may be subjected to a dispersion treatment and a classification treatment. The dispersion treatment or the classification treatment may be performed to any of the first calcined product, the second calcined product, and the annealing-treated product, or may be performed to all of the first calcined product, the second calcined product, and the annealing-treated product. As the dispersion treatment, for example, wet-type dispersion may be performed. As the classification treatment, for example, dehydration, drying, dry-type sieving, and the like may be performed after wet-type sieving. As a solvent to be used for the wet-type dispersion, for example, a deionized water can be used. For the wet-type dispersion, an individual piece dispersion medium such as an alumina ball or a zirconia ball may be used. By performing the wet-type dispersion, a γ-AlON fluorescent material having a high dispersibility in the resin constituting the fluorescent member of the light emitting device and having an easily handleable size can be obtained. As for the classification treatment after the wet-type dispersion, the calcined product and the solvent are set on a sieve, and the solvent flow is allowed to flow while applying a variety of vibrations via the sieve so that the first calcined product, the second calcined product, or the annealing-treated product may be led to pass through a mesh for wet-type sieving. After the wet-type sieving, dehydration and drying may be performed, and dry-type sieving may be further performed. Through the dry-type sieving, particles having a large particle diameter not passing through the sieve can be eliminated. In the classification treatment, an aperture of the sieve used in performing the wet-type sieving or the dry-type sieving is not specifically limited, and a sieve having an aperture corresponding to the particle diameter of the desired particles can be used.

The second calcined product obtained by the method for producing a γ-AlON fluorescent material preferably contains a composition represented by the following formula (I). Also, the annealing-treated product obtained by subjecting the second calcined product to the annealing treatment preferably contains a composition represented by the following formula (I).

$$Mn_aMg_bLi_cAl_dO_eN_fF_g \quad (I)$$

wherein a, b, c, d, e, f, and g each satisfy $0.005 \leq a \leq 0.02$, $0.01 \leq b \leq 0.035$, $0.01 \leq c \leq 0.04$, $0.3 \leq d \leq 0.45$, $0.4 \leq e \leq 0.6$, $0.03 \leq f \leq 0.06$, and $0 \leq g \leq 0.00016$, when $a+b+c+d+e+f=1$.

γ-AlON Fluorescent Material

The γ-AlON fluorescent material according to the second embodiment of the present disclosure contains the composition represented by the formula (I), and the average particle diameter, as measured according to the FSSS method, is 16.0 µm or more. The γ-AlON fluorescent material is preferably the second calcined product or the annealing-treated product obtained by the production method according to the first embodiment of the present disclosure.

In the γ-AlON fluorescent material containing the composition represented by the formula (I), the average particle diameter, as measured according to the FSSS method, is 16.0 µm or more, and is preferably 60.0 µm or less, more preferably 50.0 µm or less, even more preferably 40.0 µm or less, still more preferably 30.0 µm or less, particularly preferably 25.0 µm or less. The average particle diameter, as measured according to the FSSS method, of the γ-AlON fluorescent material is preferably 17.0 µm or more, more preferably 18.0 µm or more. In the case where the γ-AlON fluorescent material is the second calcined product produced by the production method according to the first embodiment of the present disclosure, the average particle diameter, as measured according to the FSSS method, of the γ-AlON fluorescent material is synonymous with the average particle diameter D2 of the second calcined product. In the case where the γ-AlON fluorescent material is the annealing-treated product produced by the aforementioned production method, the average particle diameter, as measured according to the FSSS method, of the γ-AlON fluorescent material is synonymous with the average particle diameter D3 of the annealing-treated product. When the average particle diameter, as measured according to the FSSS method, of the γ-AlON fluorescent material is 16.0 µm or more, it is large enough to emit light in a desired wavelength range by absorbing light emitted from a light source, and the γ-AlON fluorescent material has a high light emission intensity. When the average particle diameter, as measured according to the FSSS method, of the γ-AlON fluorescent material is preferably 60.0 µm or less, more preferably 50.0 µm or less, and when forming a light emitting device, the dispersibility of the fluorescent material in a resin constituting a fluorescent member of the light emitting device can be improved. In addition, the γ-AlON fluorescent material can be easily injected in a molded body constituting the light emitting device and easily handled in forming the light emitting device. Further, when the average particle diameter, as measured according to the FSSS method, of the γ-AlON fluorescent material is preferably 60.0 µm or less, more preferably 50.0 µm or less, and when the γ-AlON fluorescent material is used for the light emitting device in combination with other fluorescent material, light emitted from the respective fluorescent materials can be mixed in good balance without losing a balance of mixed color due to light emitted from a fluorescent material having a too large particle diameter, and a desired mixed color having suppressed color unevenness can be therefore obtained.

In the γ-AlON fluorescent material containing the composition represented by the formula (I), Mn is an activating element serving as a center of the light emission. In the composition represented by the formula (I), the parameter a represents a molar ratio of Mn serving as an activating element. In this description, the term "molar ratio" refers to the molar amount of an element in one mole of the fluorescent material having the chemical composition represented by the formula (I). When the total molar ratio of the elements excluding fluorine, which constitute the composition represented by the formula (I), is 1 (a+b+c+d+e+f=1), and when the parameter a falls within a range of 0.005 or more and 0.02 or less (0.005≤a≤0.02), the light emission intensity of the γ-AlON fluorescent material can be increased through photoexcitation in the near-UV to blue region. When the parameter a is less than 0.005 in the composition represented by the formula (I), the light emission intensity of the γ-AlON fluorescent material cannot be increased since the amount of the activating element is too small. When the parameter a is more than 0.02 in the composition represented by the formula (I), the light emission intensity may be lowered by concentration quenching due to excessive amount of the activating element. The parameter a preferably falls within a range of 0.007 or more and 0.018 or less (0.007≤a≤0.018), more preferably a range of 0.008 or more and 0.015 or less (0.008≤a≤0.015).

In the γ-AlON fluorescent material containing the composition represented by the formula (I), Mg is a divalent metal. Thus, Mg is an element capable of easily dissolving in the AlON crystal, and stabilizing the crystal structure. In the composition represented by the formula (I), the parameter b represents a molar ratio of Mg. When the total molar ratio of the elements excluding fluorine, which constitute the composition represented by the formula (I), is 1 (a+b+c+d+e+f=1), and when the parameter b falls within a range of 0.01 or more and 0.035 or less (0.01≤b≤0.035), the AlON crystal can be stabilized, and Mn serving as an activating element can be easily incorporated. When the parameter b is less than 0.01 in the composition represented by the formula (I), the crystal structure is hardly stabilized. When the parameter b is more than 0.035 in the composition represented by the formula (I), the amount of the element to be incorporated in the AlON crystal becomes too large, and the crystal structure becomes rather unstable. Then, a ratio containing an unstable phase such as an amorphous part or a low crystalline part becomes large, and thus the light emission intensity of the γ-AlON fluorescent material may be lowered. The parameter b preferably falls within a range of 0.012 or more and 0.035 or less (0.012≤b≤0.035), more preferably a range of 0.015 or more and 0.030 or less (0.015≤b≤0.030).

In the γ-AlON fluorescent material containing the composition represented by the formula (I), Li is a monovalent metal. Thus, Li is an element capable of easily dissolving in the AlON crystal, and stabilizing the crystal structure. In the composition represented by the formula (I), the parameter c represents a molar ratio of Li. When the total molar ratio of the elements excluding fluorine, which constitute the composition represented by the formula (I), is 1 (a+b+c+d+e+f=1), and when the parameter c falls within a range of 0.01 or more and 0.04 or less (0.01≤c≤0.04), the AlON crystal can be stabilized, and Mn serving as an activating element can be easily incorporated. When the parameter c is less than 0.01 in the composition represented by the formula (I), the crystal structure is hardly stabilized. When the parameter c is more than 0.04 in the composition represented by the formula (I), the amount of the element to be incorporated in the AlON crystal becomes too large, and the crystal structure becomes rather unstable. Then, a ratio containing an unstable phase such as an amorphous part or a low crystal- line part becomes large, and thus the light emission intensity of the γ-AlON fluorescent material may be lowered. The parameter c preferably falls within a range of 0.012 or more and 0.035 or less (0.012≤c≤0.035), more preferably a range of 0.015 or more and 0.030 or less (0.015≤c≤0.030).

In the γ-AlON fluorescent material containing the composition represented by the formula (I), Al, O, and N are elements forming a framework of the γ-AlON crystal. In the composition represented by the formula (I), the parameters d, e, and f represent molar ratios of Al, O, and N, respectively. When the total molar ratio of the elements excluding fluorine, which constitute the composition represented by the formula (I), is 1 (a+b+c+d+e+f=1), and when the parameter d falls within a range of 0.3 or more and 0.45 or less (0.3≤d≤0.45), the parameter e falls within a range of 0.4 or more and 0.6 or less (0.4≤e≤0.6), and the parameter f falls within a range of 0.03 or more and 0.06 or less (0.03≤f≤0.06), a stable γ-AlON crystal can be contained. The parameter d preferably falls within a range of 0.35 or more and 0.40 or less (0.35≤d≤0.40). The parameter e preferably falls within a range of 0.45 or more and 0.55 or less (0.45≤e≤0.55). The parameter f preferably falls within a range of 0.035 or more and 0.055 or less (0.035≤f≤0.055).

In the γ-AlON fluorescent material containing the composition represented by the formula (I), F is an element that can be contained as an inevitable impurity derived from raw materials or a flux, or caused from the production process. In the production of the fluorescent material, in order to promote a solid phase reaction among raw materials, a fluoride containing an element capable of constituting the γ-AlON crystal may be used as a flux. However, it is found that, when the fluoride is used as a flux, fluorine is penetrated in the γ-AlON crystal so that the body color of the γ-AlON crystal becomes dull, thereby lowering the light emission intensity. It is also found that, when fluorine is penetrated in the γ-AlON crystal, the crystal structure of the γ-AlON crystal becomes unstable, and a full width at half maximum (FWHM) of the light emission peak in the light emission spectrum of the γ-AlON fluorescent material tends to become wider. The full width at half maximum (FWHM) of the fluorescent material indicates a wavelength width of the light emission peak showing a value of 50% of the maximum light emission intensity in the light emission spectrum.

The γ-AlON fluorescent material according to the second embodiment of the present disclosure has a small molar ratio of F in the composition represented by the formula (I). Thus, the occurrence of dullness on the body color of the γ-AlON fluorescent material is suppressed, and the γ-AlON fluorescent material has a high light emission intensity. Also, since the γ-AlON fluorescent material has a small molar ratio of F in the composition represented by the formula (I), the γ-AlON crystal is stable, the full width at half maximum of the light emission peak in the light emission spectrum can be maintained low, and the color purity is high. Therefore, when a light emitting device using the γ-AlON fluorescent material is utilized in a backlight source for a liquid crystal display device, the liquid crystal display device can reproduce colors in a broad range on the chromaticity coordinate system. In the γ-AlON fluorescent material containing the composition represented by the formula (I), the amount of F is preferably small. In the composition represented by the formula (I), the parameter g represents a molar ratio of F. The parameter g falls within a range 0 or more and 0.00016 or less (0≤g≤0.00016), preferably a range of 0 or more and 0.00015 or less (0≤g≤0.00015), more preferably a range of 0 or more and 0.00010 or less (0≤g≤0.00010).

The amount of fluorine (F) in the γ-AlON fluorescent material containing the composition represented by the formula (I) is preferably less than 160 ppm by mass, more preferably 150 ppm by mass or less, even more preferably 120 ppm by mass or less, relative to the total amount of the γ-AlON fluorescent material excluding fluorine. When the amount of fluorine in the γ-AlON fluorescent material containing the composition represented by the formula (I) is less than 160 ppm by mass, the occurrence of dullness on the body color is suppressed, and the γ-AlON fluorescent material has a high light emission intensity. Also, when the amount of F in the γ-AlON fluorescent material containing the composition represented by the formula (I) is less than 160 ppm by mass, the full width at half maximum of the light emission peak in the light emission spectrum of the γ-AlON fluorescent material can be maintained narrow, and the color purity is high. Therefore, when a light emitting device using the γ-AlON fluorescent material according to the present invention is utilized in a backlight source for a liquid crystal display device, the liquid crystal display device can reproduce colors in a broad range on the chromaticity coordinate system.

In the γ-AlON fluorescent material containing the composition represented by the formula (I), the full width at half maximum of the light emission peak in the light emission spectrum obtained by photoexcitation in the near-UV to blue region is preferably in a range of 25 nm or more and 50 nm or less, more preferably in a range of 25 nm or more and 45 nm or less, even more preferably in a range of 25 nm or more and 40 nm or less. When the full width at half maximum in the light emission spectrum of the γ-AlON fluorescent material containing the composition represented by the formula (I) is in a range of 25 nm or more and 50 nm or less, the color purity can be high, and, when a light emitting device using the γ-AlON fluorescent material according to the present invention is utilized in a backlight source for a liquid crystal display device, the liquid crystal display device can reproduce colors in a broad range on the chromaticity coordinate system.

In combination with a light emitting element such as LED or LD, the γ-AlON fluorescent material obtained by the production method according to the first embodiment or the γ-AlON fluorescent material according to the second embodiment converts excitation light emitted from the light emitting element to emit light having a desired light emission peak wavelength, and can constitute a light emitting device that emits mixed light containing light from the light emitting element and light that has undergone wavelength conversion by the γ-AlON fluorescent material. For example, a light emitting element that emits light in a wavelength range of 350 nm or more and 485 nm or less can be used as the light emitting element. For example, a semiconductor light emitting element using a nitride semiconductor ($In_XAl_YGa_{1-X-Y}N$, $0≤X$, $0≤Y$, $X+Y≤1$) can be used as the light emitting element. Using a semiconductor light emitting element as an excitation light source enables a high efficiency stable light emitting device that has high linearity of output relative to input and is resistant to mechanical shock to be obtained.

The γ-AlON fluorescent material can be used in combination with other fluorescent material having a light emission peak wavelength different from that of the γ-AlON fluorescent material. The other fluorescent material than the γ-AlON fluorescent material may be a fluorescent material capable of absorbing light in the near-UV to blue region and converting the wavelength of the light to a wavelength different from that of the γ-AlON fluorescent material. Examples of the other fluorescent material than the γ-AlON fluorescent material may include $(Ca, Sr, Ba)_2SiO_4$:Eu, $(Ca, Sr, Ba)_8MgSi_4O_{16}(F, Cl, Br)_2$:Eu, $Si_{6-z}Al_zO_zN_{8-z}$:Eu ($0≤z≤4.2$), $(Sr, Ba, Ca)Ga_2S_4$:Eu, $(Lu,Y, Gd, Lu)_3(Ga,Al)_5O_{12}$:Ce, $(La,Y, Gd)_3Si_6N_{11}$:Ce, $Ca_3Sc_2Si_3O_{12}$:Ce, $CaSc_4O_4$:Ce, $K_2(Si, Ge,Ti)F_6$:Mn, $(Ca, Sr, Ba)_2Si_5N_8$:Eu, $CaAlSiN_3$:Eu, $(Ca, Sr)AlSiN_3$:Eu, $(Sr, Ca)LiAl_3N_4$:Eu, $(Ca, Sr)_2Mg_2Li_2Si_2N_6$:Eu, and $3.5MgO.0.5MgF_2.GeO_2$:Mn. In this specification, the plural elements sectioned by comma (,) in the formula expressing the composition of a fluorescent material mean that at least one of these plural elements is contained in the composition. The plural elements sectioned by comma (,) in the compositional formula means that the composition contains at least one element selected from the plural elements sectioned by the comma and may include two or more, as combined, selected from the plural elements. Also in this description, the part before the column (:) in the formula representing the composition of the fluorescent material expresses elements constituting of a host crystal and a molar ratio the elements, and the part after the column (:) expresses an activating element.

EXAMPLES

The present invention is hereunder specifically described by reference to the following Examples. The present invention is not limited to these Examples.

Production Examples 1 to 3

Preparation of First Mixture

A manganese carbonate powder ($MnCO_3$), a lithium carbonate powder ($Li_2CO_3$), a magnesium oxide powder (MgO), an aluminum oxide powder ($Al_2O_3$), and an aluminum nitride powder (AlN) were weighed to be in mass ratios of the respective compounds shown in Table 1 relative to the total amount (100% by mass) of a first mixture excluding fluorine, and mixed for 15 minutes or more by using a mortar made of aluminum oxide with a pestle to thereby obtain first mixtures. The fluorine content in each of the first mixtures, as measured according to the following method, is shown in Table 1.

First Heat Treatment

Each of the resultant first mixtures was filled in a crucible made of boron nitride and the crucible was closed with a lid. Each of the resultant first mixture in the crucible was then subjected to a first heat treatment at 1,850° C. for 4 hours in a nitrogen atmosphere (100% by volume of nitrogen gas) pressurized at 0.92 MPa, thereby obtaining first calcined products 1 to 3. The resultant first calcined products 1 to 3 were well ground using a mortar made of aluminum oxide with a pestle, and the average particle diameter D1 of each of the ground first calcined products 1 to 3 was measured.

Fluorine Content (Ppm by Mass) in First Mixture

As for the fluorine content (ppm by mass) in the first mixtures, the fluorine contents of the respective compounds contained in the first mixtures were determined, and the fluorine contents of the respective compounds contained in the first mixtures were added up to calculate the fluorine content in the first mixtures. The fluorine contents contained in the manganese carbonate, the lithium carbonate, and the magnesium oxide were measured using a measuring apparatus according to an ion electrode method (product name: IM-40S, manufactured by DKK-TOA Corp.). The fluorine contents contained in aluminum oxide and aluminum nitride were measured using an ion chromatography (product name: ICS-1500, manufactured by Dionex Corp.).

Measurement of Average Particle Diameter (D1)

Using a Fisher Sub-Sieve Sizer Model 95 (manufactured by Fisher Scientific Inc.), each of the ground first calcined products was sampled in an amount of 1 cm³ in an environment at a temperature of 25° C. and a humidity of 70% RH, and packed in a dedicated tubular container, then a dry air flow was introduced therein under a constant pressure to read a specific surface area of the sample from the differential pressure, and thus the average particle diameter D1 of each of the first calcined products was calculated according to the FSSS method. The results are shown in Table 1 or 4.

TABLE 1

| | First Mixture | | | | | First Calcined Product | |
|---|---|---|---|---|---|---|---|
| | $MnCO_3$ (% by mass) | $Li_2CO_3$ (% by mass) | MgO (% by mass) | $Al_2O_3$ (% by mass) | AlN (% by mass) | Fluorine (ppm by mass) | No. | Average Particle Diameter D1 (μm) |
| Production Example 1 | 10.32 | 4.82 | 4.57 | 68.34 | 11.94 | 12 | 1 | 15.5 |
| Production Example 2 | 9.47 | 4.87 | 4.62 | 69.03 | 12.02 | 12 | 2 | 12.4 |
| Production Example 3 | — | 5.37 | 5.09 | 76.67 | 12.86 | 11 | 3 | 8.2 |

Comparative Examples 1 and 3

The resultant first calcined product 1 in Production Example 1 was used as a γ-AlON fluorescent material of Comparative Example 1. The resultant first calcined product 2 in Production Example 2 was used as a γ-AlON fluorescent material of Comparative Example 3.

Examples 1 to 3 and 7, and Comparative Examples 2, 7, and 8

Preparation of Second Mixture

Each of the ground first calcined products 1 to 3, a manganese carbonate powder ($MnCO_3$), a lithium carbonate powder ($Li_2CO_3$), a magnesium oxide powder (MgO), an aluminum oxide powder ($Al_2O_3$), and an aluminum nitride powder (AlN) were weighed to be in mass ratios of the first calcined product and the respective compounds shown in Table 2 relative to the total amount (100% by mass) of the second mixture excluding fluorine, and mixed for 15 minutes or more by using a mortar made of aluminum oxide with a pestle to thereby obtain second mixtures.

Comparative Examples 4 to 6

Preparation of Second Mixture

The ground first calcined product 2, a manganese carbonate powder ($MnCO_3$) or a manganese fluoride powder ($MnF_2$), a lithium carbonate powder ($Li_2CO_3$) or a lithium fluoride powder (LiF), a magnesium oxide powder (MgO), an aluminum oxide powder ($Al_2O_3$), and an aluminum nitride powder (AlN) were weighed to be in mass ratios of the first calcined product and the respective compounds shown in Table 2 relative to the total amount (100% by mass) of the second mixture excluding fluorine, and mixed for 15 minutes or more by using a mortar made of aluminum oxide with a pestle to thereby obtain second mixtures.

Second Heat Treatment

Each of the resultant second mixtures was filled in a crucible made of boron nitride and the crucible was closed with a lid. Each of the resultant second mixture in the crucible was then subjected to a second heat treatment at 1,850° C. for 4 hours in a nitrogen atmosphere (100% by volume of nitrogen gas) pressurized at 0.92 MPa, thereby obtaining second calcined products. The resultant second calcined products were well ground using a mortar made of aluminum oxide with a pestle. The average particle diameter D2 of each of the ground second calcined products was measured according to the FSSS method. The results are shown in Table 4. The resultant second calcined products were respectively used as γ-AlON fluorescent materials of Examples 1 to 3 and 7, and Comparative Examples 2 and 4 to 8.

Examples 4 to 6

Annealing Treatment

The second calcined products to be used as the γ-AlON fluorescent materials of Examples 1 to 3 were subjected to an annealing treatment. Each of the second calcined products to be used as the γ-AlON fluorescent materials of Examples 1 to 3 was filled in a crucible made of boron nitride and the crucible was closed with a lid. Each of the second calcined products to be used as the γ-AlON fluorescent materials of Examples 1 to 3 in the crucible was then subjected to an annealing treatment at 1,200° C. for 2 hours in an atmosphere of a mixed gas of argon and hydrogen (66.6% by volume of Ar and 33.3% by volume of $H_2$) under an atmospheric pressure (0.1 MPa), thereby obtaining annealing-treated products. The resultant annealing-treated products were well ground using a mortar made of aluminum oxide with a pestle. The average particle diameter D3 of each of the ground annealing-treated products was measured according to the FSSS method. The results are shown in Table 4. The resultant annealing-treated products were respectively used as γ-AlON fluorescent materials of Examples 4 to 6.

Fluorine Content (% by Mass) in Second Mixture

As for the fluorine content in the second mixture, the fluorine contents of the respective compounds contained in the second mixture were determined, and the fluorine contents of the respective compounds contained in the second mixture were added up to calculate the fluorine content (% by mass) in the second mixture when the total amount of the second mixture excluding fluorine was taken as 100% by mass. The fluorine contents contained in the manganese carbonate, the lithium carbonate, and the magnesium oxide were measured using a measuring apparatus according to an ion electrode method (product name: IM-405, manufactured by DKK-TOA Corp.). The fluorine contents contained in the aluminum oxide and the aluminum nitride were measured using an ion chromatography (product name: ICS-1500, manufactured by Dionex Corp.). The fluorine contents contained in the manganese fluoride ($MnF_2$) and the lithium fluoride (LiF) were calculated from the molar ratios of fluorine in the respective compounds. The results are shown in Table 2.

Evaluation of Light Emission Characteristics
Light Emission Peak Wavelength and Relative Light Emission Intensity The light emission characteristics of each of the γ-AlON fluorescent materials of Examples and Comparative Examples were measured. Using a quantum efficiency mea-

TABLE 2

| | | First Calcined Product | | | | | | | $Al_2O_3 +$ | |
|---|---|---|---|---|---|---|---|---|---|---|
| | No. | Content (% by mass) | $MnCO_3$ (% by mass) | $Li_2CO_3$ (% by mass) | MgO (% by mass) | $Al_2O_3$ (% by mass) | AlN (% by mass) | $MnF_2$ (% by mass) | LiF (% by mass) | AlN (% by mass) | F (% by mass) |
| Comparative Example 1 | 1 | 100.0 | — | — | — | — | — | — | — | — | — |
| Comparative Example 2 | 1 | 20.0 | 8.3 | 3.9 | 3.7 | 54.7 | 9.6 | — | — | 64.2 | — |
| Example 1 | 1 | 40.0 | 6.2 | 2.9 | 2.7 | 41.0 | 7.2 | — | — | 48.2 | — |
| Example 2 | 1 | 60.0 | 4.1 | 1.9 | 1.8 | 27.3 | 4.8 | — | — | 32.1 | — |
| Example 3 | 1 | 80.0 | 2.1 | 1.0 | 0.9 | 13.7 | 2.4 | — | — | 16.1 | — |
| Example 4 | 1 | 40.0 | 6.2 | 2.9 | 2.7 | 41.0 | 7.2 | — | — | 48.2 | — |
| Example 5 | 1 | 60.0 | 4.1 | 1.9 | 1.8 | 27.3 | 4.8 | — | — | 32.1 | — |
| Example 6 | 1 | 80.0 | 2.1 | 1.0 | 0.9 | 13.7 | 2.4 | — | — | 16.1 | — |
| Comparative Example 3 | 2 | 100.0 | — | — | — | — | — | — | — | — | — |
| Example 7 | 2 | 40.0 | 5.7 | 2.9 | 2.8 | 41.4 | 7.2 | — | — | 48.6 | 0.000015 |
| Comparative Example 4 | 2 | 40.0 | — | 3.0 | 2.8 | 42.4 | 7.1 | 4.7 | — | 49.5 | 1.970350 |
| Comparative Example 5 | 2 | 40.0 | 5.8 | — | 2.8 | 42.2 | 7.1 | — | 2.1 | 49.4 | 1.582045 |
| Comparative Example 6 | 2 | 40.0 | — | — | 2.9 | 43.3 | 7.0 | 4.7 | 2.1 | 50.3 | 3.489058 |
| Comparative Example 7 | 3 | 92.6 | 7.4 | — | — | — | — | — | — | — | — |
| Comparative Example 8 | 3 | 89.3 | 10.7 | — | — | — | — | — | — | — | — |

Composition Analysis

As for the γ-AlON fluorescent material in each of Examples and Comparative Examples, the composition analysis of the elements excluding fluorine, which were contained in the γ-AlON fluorescent material, was performed according to an ICP emission spectral analysis method by using an inductively coupled plasma emission analyzer (manufactured by Perkin Elmer, Inc.). As for Mn, Mg, Li, Al, O, and N, the molar ratio of each of the compounds was calculated when the total amount of the elements was taken as 1. The results are shown in Table 3. As for the γ-AlON fluorescent material in each of Comparative Examples 5 and 6, the composition analysis of the γ-AlON fluorescent material was not performed since the fluorine content, as measured according to the following method, was more than 150 ppm.

Fluorine Content (Ppm by Mass) in γ-AlON Fluorescent Material

The fluorine content contained in the γ-AlON fluorescent material in each of Example 7 and Comparative Examples 3 to 6 was measured using an ion chromatography (product name: ICS-1500, manufactured by Dionex Corp.). The results are shown in Table 3.

Measurement of Average Particle Diameters (D2 and D3)

The average particle diameter D2 of each of the second calcined products and the average particle diameter D3 of each of the annealing-treated products according to the FSSS method were calculated by the same apparatus and the method as in the case of measuring the average particle diameter D1 of the first calcined product. The results are shown in Table 4.

suring apparatus (QE-2000, manufactured by Otsuka Electronics Co., Ltd.), each fluorescent material was irradiated with light having an excitation wavelength of 450 nm to measure the light emission spectrum thereof at room temperature (25±5° C.). The light emission peak wavelength and the light emission intensity (%) were determined from the resultant light emission spectrum of each of the γ-AlON fluorescent materials. The relative light emission intensity of the γ-AlON fluorescent material in each of Examples 1 to 6 and Comparative Examples 2, 7, and 8 was determined when the light emission intensity of the γ-AlON fluorescent material in Comparative Example 1 was taken as 100%. The relative light emission intensity of the γ-AlON fluorescent material in each of Example 7 and Comparative Examples 4 to 6 was determined when the light emission intensity of the γ-AlON fluorescent material in Comparative Example 3 was taken as 100%. The results are shown in Table 4.

Full Width at Half Maximum

The full width at half maximum (FWHM) of the resultant light emission spectrum of the γ-AlON fluorescent material in each of Examples and Comparative Examples was determined. The full width at half maximum (FWHM) of the fluorescent material indicates a wavelength width of the light emission peak showing a value of 50% of the maximum light emission intensity in the light emission spectrum. The results are shown in Table 4.

Reflectance (%) and Absorptivity (%)

As for the γ-AlON fluorescent material in each of Examples and Comparative Examples, using a fluorospectrophotometer (F-4500, manufactured by Hitachi High- Technologies Corp.), reflected light at 450 nm and reflected light at 730 nm were measured at room temperature (25±5° C.) by irradiating the γ-AlON fluorescent material as a sample with light emitted from a halogen lamp as an excitation light source, and scanning the wavelengths of the spectrometer at the exciting side and the fluorescent material side together. The ratio of the reflected light at 730 nm to light having a wavelength of 450 nm was measured as a reflectance (%) at 730 nm based on a reflectance of calcium hydrogen phosphate ($CaHPO_4$). The ratio of the reflected light at 450 nm to light having a wavelength of 450 nm was measured as a reflectance (%) at 450 nm based on a reflectance of calcium hydrogen phosphate ($CaHPO_4$), and the value obtained by subtracting the reflectance (%) at 450 nm from 100% was defined as an absorptivity (%) at 450 nm. The results are shown in Table 4.

TABLE 3

| | First Calcined Product | | Composition (molar ratio) | | | | | | | Concentration |
|---|---|---|---|---|---|---|---|---|---|---|
| | | Content | (a + b + c + d + e + f = 1) | | | | | | | (ppm by mass) |
| | No. | (% by mass) | Mn a | Mg b | Li c | Al d | O e | N f | F g | F |
| Comparative Example 1 | 1 | 100.0 | 0.011 | 0.025 | 0.024 | 0.375 | 0.518 | 0.046 | — | — |
| Comparative Example 2 | 1 | 20.0 | 0.010 | 0.024 | 0.023 | 0.380 | 0.517 | 0.045 | — | — |
| Example 1 | 1 | 40.0 | 0.010 | 0.025 | 0.023 | 0.382 | 0.513 | 0.048 | — | — |
| Example 2 | 1 | 60.0 | 0.010 | 0.025 | 0.023 | 0.382 | 0.514 | 0.047 | — | — |
| Example 3 | 1 | 80.0 | 0.010 | 0.025 | 0.023 | 0.385 | 0.511 | 0.047 | — | — |
| Example 4 | 1 | 40.0 | 0.010 | 0.024 | 0.023 | 0.381 | 0.513 | 0.048 | — | — |
| Example 5 | 1 | 60.0 | 0.010 | 0.024 | 0.024 | 0.378 | 0.521 | 0.044 | — | — |
| Example 6 | 1 | 80.0 | 0.009 | 0.025 | 0.023 | 0.381 | 0.519 | 0.042 | — | — |
| Comparative Example 3 | 2 | 100.0 | 0.012 | 0.026 | 0.024 | 0.386 | 0.504 | 0.048 | 0.000022 | 20 |
| Example 7 | 2 | 40.0 | 0.012 | 0.025 | 0.015 | 0.379 | 0.520 | 0.050 | 0.000076 | 70 |
| Comparative Example 4 | 2 | 40.0 | 0.012 | 0.025 | 0.014 | 0.374 | 0.525 | 0.050 | 0.000173 | 160 |
| Comparative Example 5 | 2 | 40.0 | — | — | — | — | — | — | 0.000573 | 530 |
| Comparative Example 6 | 2 | 40.0 | — | — | — | — | — | — | 0.000465 | 430 |
| Comparative Example 7 | 3 | 92.6 | 0.007 | 0.025 | 0.022 | 0.375 | 0.523 | 0.049 | — | — |
| Comparative Example 8 | 3 | 89.3 | 0.009 | 0.024 | 0.022 | 0.372 | 0.528 | 0.046 | — | — |

TABLE 4

| | Heat Treatment | | | First Calcined Product Average Particle Diameter D1 (μm) | Second Calcined Product Average Particle Diameter D2 (μm) | Annealing-treated Product Average Particle Diameter D3 (μm) | Light Emission Characteristics | | | | |
|---|---|---|---|---|---|---|---|---|---|---|---|
| | First Heat Treatment | Second Heat Treatment | Annealing Treatment | | | | Light Emission Peak Wavelength (nm) | Full Width at Half Maximum (nm) | Relative Light Emission Intensity (%) | Absorptivity (%) 450 nm | Reflectance (%) 730 nm |
| Comparative Example 1 | done | not done | not done | 15.5 | — | — | 522 | 41.3 | 100.0 | 20.2 | 91.6 |
| Comparative Example 2 | done | done | not done | 15.5 | 14.8 | — | 521 | 39.6 | 96.5 | 21.5 | 88.9 |
| Example 1 | done | done | not done | 15.5 | 16.0 | — | 522 | 39.2 | 102.3 | 23.9 | 86.7 |
| Example 2 | done | done | not done | 15.5 | 17.5 | — | 523 | 39.1 | 105.7 | 24.2 | 87.4 |
| Example 3 | done | done | not done | 15.5 | 19.5 | — | 521 | 39.4 | 104.2 | 23.6 | 88.5 |
| Example 4 | done | done | done | 15.5 | 16.0 | 16.0 | 524 | 39.3 | 111.5 | 22.0 | 89.6 |
| Example 5 | done | done | done | 15.0 | 18.0 | 19.0 | 522 | 40.5 | 120.8 | 25.4 | 87.0 |
| Example 6 | done | done | done | 15.5 | 19.5 | 19.5 | 521 | 39.5 | 113.0 | 24.4 | 87.7 |
| Comparative Example 3 | done | not done | not done | 12.4 | — | — | 524 | 42.0 | 100.0 | 21.0 | 91.5 |
| Example 7 | done | done | not done | 12.4 | 20.0 | — | 523 | 45.2 | 102.9 | 29.6 | 84.1 |
| Comparative Example 4 | done | done | not done | 12.4 | 26.5 | — | 522 | 49.4 | 59.4 | 38.8 | 71.3 |
| Comparative Example 5 | done | done | not done | 12.4 | 27.5 | — | 524 | 48.7 | 63.9 | 39.7 | 71.8 |
| Comparative Example 6 | done | done | not done | 12.4 | 29.5 | — | 529 | 53.8 | 55.3 | 37.5 | 75.0 |

TABLE 4-continued

| | Heat Treatment | | | First Calcined Product Average Particle Diameter D1 (μm) | Second Calcined Product Average Particle Diameter D2 (μm) | Annealing-treated Product Average Particle Diameter D3 (μm) | Light Emission Characteristics | | | Absorptivity (%) 450 nm | Reflectance (%) 730 nm |
|---|---|---|---|---|---|---|---|---|---|---|---|
| | First Heat Treatment | Second Heat Treatment | Annealing Treatment | | | | Light Emission Peak Wavelength (nm) | Full Width at Half Maximum (nm) | Relative Light Emission Intensity (%) | | |
| Comparative Example 7 | done | done | not done | 8.2 | 13.8 | — | 519 | 36.6 | 89.0 | 22.3 | 85.9 |
| Comparative Example 8 | done | done | not done | 8.2 | 13.4 | — | 523 | 38.5 | 93.3 | 23.5 | 86.4 |

In each of Examples 1 to 3, the second calcined product obtained by subjecting the mixture containing the first calcined product in an amount of more than 20% by mass and 80% by mass or less to the second heat treatment was used as a γ-AlON fluorescent material. In the γ-AlON fluorescent material of each of Examples 1 to 3, the first calcined product acted as a seed crystal to promote the crystal growth, and the average particle diameter D2, as measured according to the FSSS method, became large as 16.0 μm or more. The γ-AlON fluorescent material of each of Examples 1 to 3 had a narrower full width at half maximum than that of Comparative Example 1 and a higher relative light emission intensity than that of Comparative Example 1. The γ-AlON fluorescent material of each of Examples 1 to 3 had a higher absorptivity at 450 nm than that of the γ-AlON fluorescent material of Comparative Example 1, and efficiently absorbed light in the near-UV to blue region to emit green light. The γ-AlON fluorescent material of each of Examples 1 to 3 had a larger particle diameter and a higher absorptivity at 450 nm than those of the fluorescent material of Comparative Example 1 or 2, and thus the reflectance at 730 nm was slightly lowered than that of the fluorescent material of Comparative Example 1 or 2. As shown in Examples 1 to 3, when the total content of the aluminum oxide and the aluminum nitride in the second mixture was 15% by mass or more, the first calcined product acted as a seed crystal to promote the crystal growth.

In the γ-AlON fluorescent material of Comparative Example 2, the amount of the first calcined product contained in the second mixture was low as 20% by mass. Thus, the crystal growth was not promoted from the seed crystal, the average particle diameter D2 of the second calcined product was small as less than 16.0 μm, and the relative light emission intensity was also lower than that of the γ-AlON fluorescent material of Comparative Example 1 that was not subjected to the second heat treatment.

In each of Examples 4 to 6, the annealing-treated product obtained by further subjecting the second calcined product used as a γ-AlON fluorescent material in each of Examples 1 to 3 to the annealing treatment was used as a γ-AlON fluorescent material. In the γ-AlON fluorescent material of each of Examples 4 to 6, Mn which was other than divalence contained in the second calcined product could be reduced by the annealing treatment to increase the ratio of the divalent Mn in the γ-AlON fluorescent material. Thus, the relative light emission intensity thereof was higher than that of the γ-AlON fluorescent material of each of Examples 1 to 3 that was not subjected to the annealing treatment and was composed of the second calcined product having the same content of the first calcined product in the second mixture.

The γ-AlON fluorescent material of Example 7 contained no fluoride as a raw material or a flux in the second mixture. Thus, the fluorine content in the γ-AlON fluorescent material was 150 ppm by mass or less, and in the composition represented by the formula (I), the value of the parameter g indicating a molar ratio of fluorine satisfied a value of 0 or more and 0.00016 or less when the total molar ratio of the elements constituting the γ-AlON fluorescent material excluding fluorine was taken as 1. The γ-AlON fluorescent material of Example 7 had a higher light emission intensity than that of the γ-AlON fluorescent material of Comparative Example 3 that was not subjected to the second heat treatment.

The γ-AlON fluorescent material of each of Comparative Examples 4 and 6 contained fluoride in the second mixture. By the effect of the fluoride flux, the average particle diameter D2 of the γ-AlON fluorescent material formed from the second calcined product was larger than that of the γ-AlON fluorescent material of Example 7, but the relative light emission intensity was lower than that of the γ-AlON fluorescent material of Example 7. Further, in the γ-AlON fluorescent material of each of Comparative Examples 4 and 6, the fluorine content was large as more than 150 ppm by mass, and in the composition represented by the formula (I), the value of the parameter g indicating a molar ratio of fluorine did not satisfy a value of 0 or more and 0.00016 or less when the total molar ratio of the elements constituting the γ-AlON fluorescent material excluding fluorine was taken as 1. From the results, it could be presumed that, in the γ-AlON fluorescent material of each of Comparative Examples 4 and 6, fluorine was incorporated in the crystal structure, and the crystal structure became unstable. In the γ-AlON fluorescent material of each of Comparative Examples 4 and 6, there was such a tendency that the light emission peak wavelength was shifted to the long wavelength side or the full width at half maximum became wider, as compared with the γ-AlON fluorescent material of Example 7. In the γ-AlON fluorescent material of Comparative Examples 6 having a large amount of fluorine, the light emission peak wavelength was obviously shifted to the long wavelength side and the full width at half maximum became wider, as compared with the γ-AlON fluorescent material of Example 7.

In the γ-AlON fluorescent material of each of Comparative Examples 7 and 8, the content of the first calcined product in the second mixture was high as more than 82% by mass. Thus, the amount of the compounds to be raw materials contained in the second mixture became relatively low, the crystal growth was not promoted, and the particle diameter D2 of the second calcined product was less than 16.0 μm.

The γ-AlON fluorescent material according to one embodiment of the description has a high light emission intensity through photoexcitation in the near-UV to blue region, and the light emitting device using the γ-AlON fluorescent material can be used in a broad field of ordinary lightings, in-car lightings, displays, backlights for liquid crystal devices, traffic lights, illumination-type switches.

The invention claimed is:

1. A method for producing a γ-AlON fluorescent material, comprising:

preparing a first mixture containing a compound containing Mn, a compound containing Li, a compound containing Mg, an aluminum oxide, and an aluminum nitride, in which the amount of fluorine is 150 ppm by mass or less relative to the total amount of the first mixture excluding fluorine, and subjecting the first mixture to a first heat treatment to obtain a first calcined product having an average particle diameter D1, as measured according to a Fisher Sub-Sieve Sizer method, of 10.0 μm or more; and preparing a second mixture containing the first calcined product, a compound containing Mn, a compound containing Li, a compound containing Mg, an aluminum oxide, and an aluminum nitride, in which the amount of fluorine is 150 ppm by mass or less relative to the total amount of the second mixture excluding fluorine, and subjecting the second mixture to a second heat treatment to obtain a second calcined product having an average particle diameter D2, as measured according to the Fisher Sub-Sieve Sizer method, of 16.0 μm or more, wherein the second mixture contains the first calcined product in an amount of more than 20% by mass and 82% by mass or less relative to the total amount of the second mixture excluding fluorine.

2. The method for producing a γ-AlON fluorescent material according to claim 1, wherein at least one of the temperature in the first heat treatment and the temperature in the second heat treatment falls within a range of 1,600° C. or higher and 1,900° C. or lower.

3. The method for producing a γ-AlON fluorescent material according to claim 1, further comprising subjecting the second calcined product to an annealing treatment to obtain an annealing-treated product.

4. The method for producing a γ-AlON fluorescent material according to claim 3, wherein the temperature in the annealing treatment falls within a range of 1,100° C. or higher and 1,500° C. or lower.

5. The method for producing a γ-AlON fluorescent material according to claim 1, wherein the second mixture comprises the aluminum oxide and the aluminum nitride in a total amount of 15% by mass or more relative to the total amount of the second mixture excluding fluorine.

6. The method for producing a γ-AlON fluorescent material according to claim 1, wherein the second mixture comprises the first calcined product in an amount of 40% by mass or more and 80% by mass or less relative to the total amount of the second mixture excluding fluorine.

7. The method for producing a γ-AlON fluorescent material according to claim 1, wherein the second calcined product comprises a composition represented by the following formula (I):

$$Mn_aMg_bLi_cAl_dO_eN_fF_g \quad (I)$$

wherein a, b, c, d, e, f, and g each satisfy 0.005≤a≤0.02, 0.01≤b≤0.035, 0.01≤c≤0.04, 0.3≤d≤0.45, 0.4≤e≤0.6, 0.03≤f≤0.06, and 0≤g≤0.00016, when a+b+c+d+e+f=1.

8. A γ-AlON fluorescent material, comprising a composition represented by the following formula (I), and having an average particle diameter, as measured according to the Fisher Sub-Sieve Sizer method, of 16 μm or more:

$$Mn_aMg_bLi_cAl_dO_eN_fF_g \quad (I)$$

wherein a, b, c, d, e, f, and g each satisfy 0.005≤a≤0.02, 0.01≤b≤0.035, 0.01≤c≤0.04, 0.3≤d≤0.45, 0.4≤e≤0.6, 0.03≤f≤0.06, and 0≤g≤0.00016, when a+b+c+d+e+f=1.

* * * * *